(12) United States Patent
Durian et al.

(10) Patent No.: US 6,467,667 B1
(45) Date of Patent: Oct. 22, 2002

(54) DEVICE FOR SPLITTING AT LEAST ONE OPTICAL FIBER

(75) Inventors: Oliver Durian, Bobingen (DE); Dieter Krause, Uffing Am Staffelsee (DE)

(73) Assignee: Siemens Dematic AG, Nürnberg (DE)

( * ) Notice: Subject to any disclaimer, the term of this patent is extended or adjusted under 35 U.S.C. 154(b) by 0 days.

(21) Appl. No.: 09/890,338

(22) PCT Filed: Jan. 4, 2000

(86) PCT No.: PCT/DE00/00030
§ 371 (c)(1),
(2), (4) Date: Jul. 30, 2001

(87) PCT Pub. No.: WO00/45205
PCT Pub. Date: Aug. 3, 2000

(30) Foreign Application Priority Data

Jan. 29, 1999 (DE) .......................................... 199 03 569

(51) Int. Cl.[7] .............................................. C03B 37/16
(52) U.S. Cl. ............................ 225/105; 225/2; 225/96.5
(58) Field of Search ............................ 225/2, 25, 96.5, 225/105, 103, 104; 83/376, 382

(56) References Cited

U.S. PATENT DOCUMENTS

| 4,473,942 A | * | 10/1984 | Ridgway | 225/2 |
|---|---|---|---|---|
| 4,565,310 A | | 1/1986 | Krause | 225/2 |
| 5,104,021 A | * | 4/1992 | Seike et al. | 225/2 |
| 5,129,567 A | * | 7/1992 | Suda et al. | 225/96.5 |
| 5,368,211 A | | 11/1994 | Michel et al. | 225/96.5 |
| 5,395,025 A | * | 3/1995 | Borer et al. | 225/2 |
| 6,244,488 B1 | * | 6/2001 | Tanaka | 225/96.5 |

FOREIGN PATENT DOCUMENTS

| DE | 35 27 734 | 2/1987 |
|---|---|---|
| DE | 37 35 885 | 5/1989 |

OTHER PUBLICATIONS

Abstract of Japanese Patent Publication No. 3238401, published Oct. 24, 1991.
Abstract of Japanese Patent Publication No. 1293307, published Nov. 27, 1989.

* cited by examiner

Primary Examiner—Hwei-Slu Payer
(74) Attorney, Agent, or Firm—Staas & Halsey LLP

(57) ABSTRACT

Device for severing at least one optical fiber When severing optical fibers (1) with conventional severing devices, after the severing operation the severed fibers (1) are distributed in a disorderly manner on the second fixing element (26), with the result that they can only be removed with difficulty and laboriously. Using a bonding device (20, 21) in the form of a rocker (21) with an adhesive strip (20), the fiber ends are adhesively bonded on during the severing operation, with the result that they remain in an orderly manner on the adhesive strip after the severing operation. The rocker (21) is in this case mounted such that it can pivot between an inserting position and a severing position, in order to facilitate the insertion of the fibers (1).

20 Claims, 2 Drawing Sheets

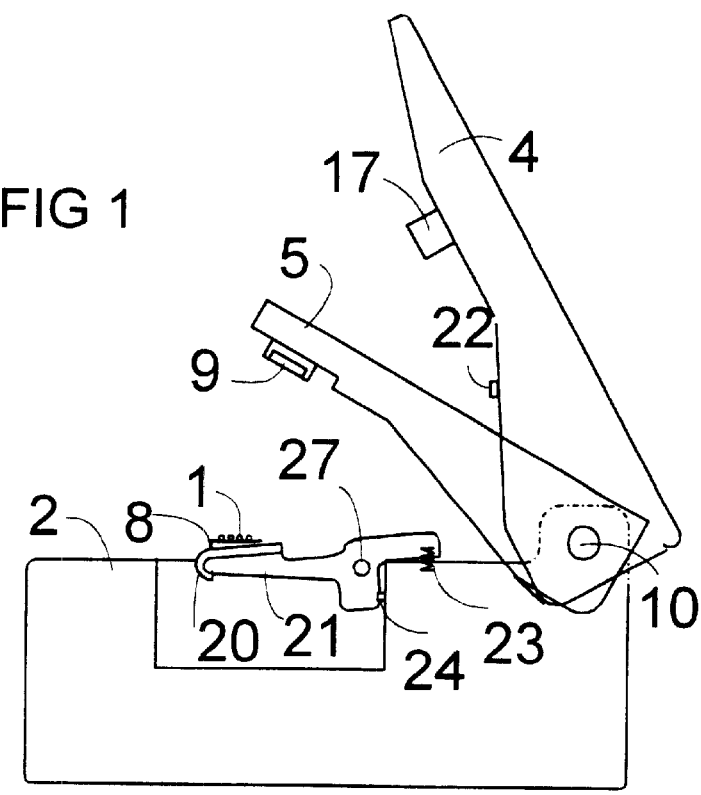
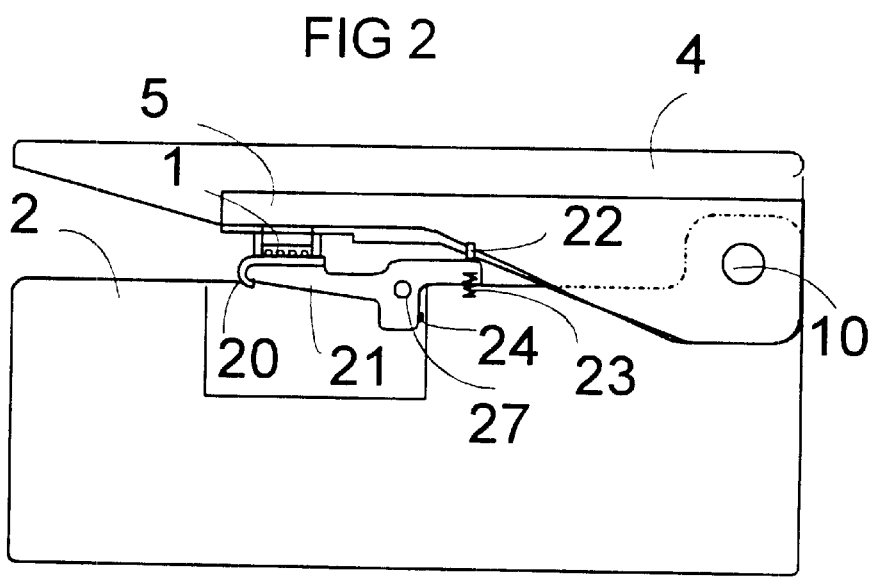

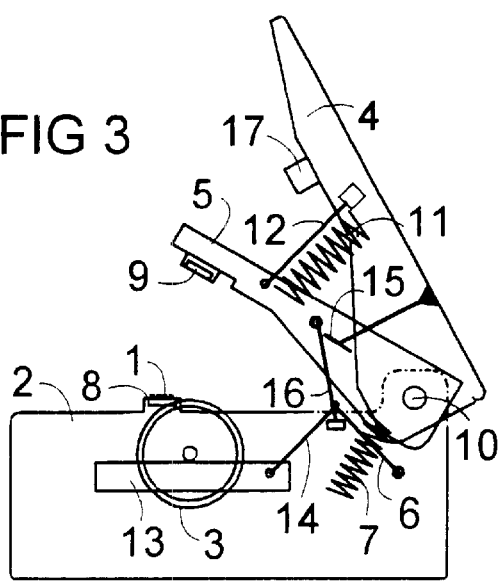
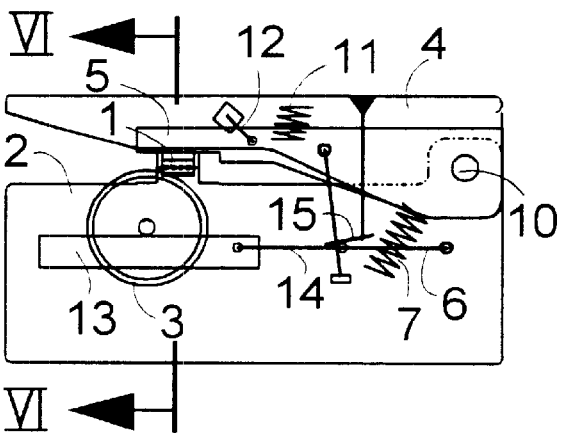
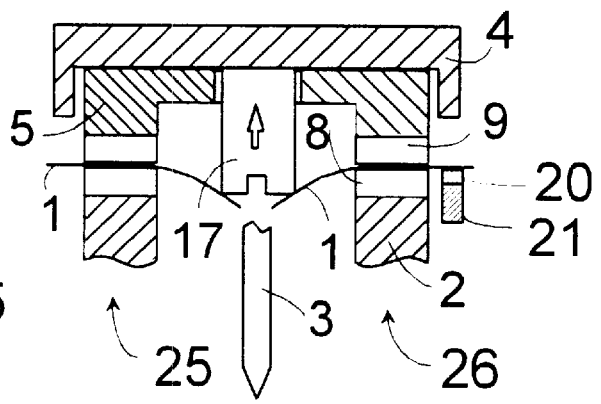

DEVICE FOR SPLITTING AT LEAST ONE OPTICAL FIBER

CROSS REFERENCE TO RELATED APPLICATIONS

This application is based on and hereby claims priority to PCT Application No. PCT/DE00/00030 filed on Jan. 4, 2000 and German Application No. 199 93 569.5 filed on Jan. 29, 1999 in Germany, the contents of which are hereby incorporated by reference.

BACKGROUND OF THE INVENTION

The invention relates to a device for severing at least one optical fiber.

Optical fibers, such as are used for example in optical communications technology, require a very smooth perpendicular end face in order to minimize the coupling-in losses of the light. For the severing of fibers, they are therefore initially clamped in devices designed especially for the purpose, subsequently scored and ruptured. This method allows rapid severing of the fibers with adequate quality of the end faces.

DE 37 35 855 A1 discloses a device in which a plurality of fibers arranged in parallel and held together by an adhesive stripline can be severed simultaneously. In this way, bundles comprising twelve fibers, for example, are simultaneously severed and consequently prepared for connection to optical components, such as receivers or light-emitting diodes. The fibers are in this case held in two positions, displaced in the axial direction of the fiber, by two fixing elements. Arranged in the middle of the two fixing elements there is for example a displaceable scoring knife as a severing device, which scores the fibers in such a way that they are subsequently ruptured by pressure from the opposite side and have a defined end face.

Whereas the fibers are still held in an orderly manner on the side of the first fixing element, for example by the fiber bundle present, after the severing operation, there is no fixing for the fiber ends at the second fixing element after the severing operation, with the result that these fiber ends are distributed in a disorderly manner at the former clamping points of the fixing elements and can only be laboriously removed with difficulty.

SUMMARY OF THE INVENTION

It is therefore the object of the invention to specify a device with which the fiber scrap after severing can be removed more easily.

By providing a bonding device outside the fixing elements it is possible for the fiber scrap to be fixed on this bonding device after severing and for this fiber scrap subsequently to be conveniently removed. The fibers are held by an adhesive surface after severing and can no longer be spread in a disorderly manner. Subsequently, they can, for example, be easily removed by hand from the bonding device and can be deposited in corresponding containers for disposal.

In an advantageous embodiment, the bonding device is mounted such that it can pivot about an axis parallel to the fiber axis between a severing position and an inserting position. In the severing position, the bonding device is connected to the at least one fiber, whereas in the inserting position there is no adhesive bond between the bonding device and the fiber. As a result, the fibers can be easily inserted into the device.

Particularly simple operation of the device can be achieved by an actuating member which operates the fixing elements and the severing device after the insertion of the fiber additionally moving the bonding device, designed as a rocker, into the severing position. As a result, the severing operation can be performed by a simple manual action, which leads to a time saving in comparison with awkward handling of a number of functional elements.

In an advantageous embodiment, a first and a second threaded pin are provided in order to set the severing position of the rocker and the inserting position of the rocker. The setting can in this case be chosen for example such that the scoring wheel no longer touches the fiber scrap after the severing operation.

The rocker may be moved by a compression spring after the severing operation from the severing position back again into the inserting position.

The bonding device may be designed such that it has adhesive strips, from which the severed ends of the fibers can be easily removed.

According to one embodiment, when the adhesive force subsides, the adhesive strips are exchangeably fastened on the rocker.

The device may be used for severing a plurality of fibers arranged in parallel, since it is easy to dispose of the fiber scrap then occurring in comparison with a single fiber.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 1 shows a schematic side view of a device according to the invention in the inserting position, FIG. 2 shows a schematic side view of the device according to the invention in the severing position, FIG. 3 shows a schematic section through a device according to the invention in side view for the explanation of the severing function, FIG. 4 shows a schematic section in side view through the device in the severing position and FIG. 5 shows a section along the sectional line VI—VI of FIG. 4.

Represented in FIG. 1 is a device for severing at least one optical fiber 1, with a basic body 2 which has an actuating member 4 and a clamping lever 5. The individual fibers 1 or the bundles of fibers are placed on clamping jaws 8 and are held during the later severing operation between the clamping jaws 8 and counter-clamping jaws 9 arranged on the clamping lever 5. The clamping jaws 8 and the counter-clamping jaws 9 in this case form a first fixing element 25 and a second fixing element 26 along the axial direction of the fiber 1, as represented in section in FIG. 5. After the fixing, a scoring knife 3 is moved perpendicularly in relation to the fiber axis by the actuating member 4, as described later in more detail with reference to FIGS. 3 and 4. After the scoring, a rupturing punch 17 is placed on the side of the fiber 1 opposite the scoring knife 3 in order to rupture the fiber 1. As this happens, a defined smooth end face of the fibers 1 is produced, ensuring that there are only the most minor coupling losses of the light into and out of the fiber.

Arranged behind the second fixing element 26 in the direction of the fiber is a bonding device 20, 21, which comprises a rocker 21 and an adhesive strip 20 fastened on the rocker. The rocker 21 is in this case movable about a movement axis 27 parallel to the fiber axis. The movement is in this case restricted by stops in the form of threaded pins 22, 24 and a compression spring 23. In the inserting position represented in FIG. 1, the adhesive strip 20 is not yet touching the fibers 1, in order that the fibers 1 can be conveniently placed into the device.

Only when the severing operation is initiated by pressing down the actuating member 4, and consequently the actuating member 4, and the clamping lever 5 are pivoted about an axis 10 located parallel to the fiber axis, is the rocker 21 moved by a first threaded pin 22, arranged on the actuating member 4, into a position in which the adhesive strip 20 touches the fiber ends 1 and the fiber ends are consequently fixed. This state is represented in FIG. 2. After the severing operation, the actuating member 4 is swung back again, and a compression spring 23 fastened on the rocker 21 moves the rocker 21 into the inserting position again. The inserting position can in this case be set by a second threaded pin 24, located on the rocker 21 on the basic body 2. The position of the rocker 21 can be set by using the first threaded pin 22 and the second threaded pin 24 in such a way that not only is insertion facilitated but also the necessary adhesive force is brought about during the severing operation. In addition, the rocker position can be set such that the scoring knife 3, represented in FIGS. 3 and 4, as the severing device does not touch the fiber scrap when it is moving back.

The adhesive strip 20 is in this case to be designed such that the fiber ends can be easily removed again by hand from the adhesive strip 20. When the adhesive force of the adhesive strip 20 subsides, the adhesive strip 20 can be easily removed from the rocker 21 by a suitably chosen adhesive located between the rocker 21 and the adhesive strip 20 and can be replaced by a new adhesive strip 20.

According to FIG. 3, the severing device has a scoring knife 3, which is mounted in such a way that it can be displaced rectilinearly. Furthermore, the hand-lever-like operating member 4, the clamping lever 5 and a crank-like lever 6 are mounted on the basic body 2. A restoring spring 7 is clamped between the basic body 2 and the clamping lever 5.

The clamping lever 5 and the operating member 4 are mounted pivotably about the common axis 10 on the basic body 2. The clamping spring 11 biased between them spreads them apart until contact is made with a stop element 12 on each side. In the starting position shown, the clamping lever 5 has been opened so far that the fibers 1 can be conveniently inserted. A rod 14 similar to a connecting rod is connected in an articulated manner to the crank-like lever 6 and the carriage 13 and, together with these, forms a crank drive, which converts a pivoting movement of the lever 6 into a rectilinearly horizontal movement of the carriage 13 with the scoring knife 3.

Fastened on the operating member 4 at a distance from the lever 6 is a stop 15, which is aimed at the movable end of the lever 6. Also pivotably mounted on the clamping lever 5 is a rod-like restoring element 16, which is hooked in a longitudinally displaceable manner by its other end in the vicinity of the joint formed between the rod 14 and the lever 6. In the position shown, the rod 14 and the lever 6 are angled away from each other approximately perpendicularly, with the result that the scoring knife 3 is retracted to this side.

According to FIG. 4, the operating member has been pivoted further into its end position. In this case, the lever 6 and the rod 14 have been pivoted by the stop 15 into an extended position, whereby the carriage 13 with the scoring knife 3 has been displaced to an opposite side of the fibers 1 and the fibers have been notched. A rupturing punch 17 fastened on the operating member 4 at the level of the clamping jaws 8 has then bent the fibers 1 until they rupture, as can be seen for example from FIG. 5. During the pivoting back of the operating member 4, the scoring knife 3 is then drawn into its original position again and, as already described, the fiber scrap can be easily removed from the bonding device.

The invention has been described in detail with particular reference to preferred embodiments thereof and examples, but it will be understood that variations and modifications can be effected within the spirit and scope of the invention.

What is claimed is:

1. An apparatus for severing at least one fiber, comprising:
   an actuating member that pivots about a first axis toward and away from the fiber;
   a clamping member that pivots about the first axis toward and away from the fiber, the clamping member having first and second spaced apart clamps;
   a scoring device, actuated by the actuating member to move in a direction perpendicular to the axis of the fiber;
   a bonding device that pivots about a second axis toward and away from the fiber, the bonding device being moved toward the fiber by the actuating member as the actuating member pivots toward the fiber, the bonding device releasably adhering the fiber; and
   a punch mounted on the actuating member so as to face the fiber.

2. An apparatus for severing at least one optical fiber, comprising:
   first and second fixing elements for fixing the at least one fiber respectively at first and second positions separated from each other along the axial direction of the fiber;
   a severing device, which is arranged between the first and second fixing elements; and
   a bonding device which is arranged in the axial direction of the at least one fiber on the side of one of the fixing elements opposite the severing device for the detachable adhesive bonding of the at least one fiber, the bonding device being mounted such that it can pivot about an axis parallel to the fiber axis between a severing position and an inserting position, the bonding device being in adhesive connection with the at least one fiber in the severing position.

3. The apparatus for severing at least one optical fiber as claimed in claim 2, wherein
   the bonding device comprises a rocker,
   an actuating member is provided for actuating the first and second fixing elements and the severing device so as to cause a severing operation after insertion of the least one fiber, and
   the actuating member moves the bonding device and the rocker from the inserting position to the severing position during the severing operation.

4. The apparatus for severing at least one optical fiber as claimed in claim 3, wherein the actuating member has a first threaded pin for setting the severing position of the rocker.

5. The apparatus for severing at least one optical fiber as claimed in claim 4 wherein a second threaded pin is provided for setting the inserting position of the rocker.

6. The apparatus for severing at least one optical fiber as claimed in claim 4, wherein a compression spring is arranged on the rocker to move the rocker from the severing position to the inserting position after the severing operation.

7. The apparatus for severing at least one optical fiber as claimed in claim 4, wherein the bonding device comprises adhesive strips, from which severed ends of the at least one fiber can be easily removed.

8. The apparatus for severing at least one optical fiber as claimed in claim 4 wherein the apparatus is designed for severing a plurality of fibers arranged in parallel.

9. The apparatus for severing at least one optical fiber as claimed in claim 3 wherein a threaded pin is provided for setting the inserting position of the rocker.

10. The apparatus for severing at least one optical fiber as claimed in claim 9, wherein a compression spring is arranged on the rocker so as to move the rocker from the severing position to the inserting position after the severing operation such that the rocker is biased against the second threaded pin in the severing position.

11. The apparatus for severing at least one optical fiber as claimed in claim 9, wherein the bonding device comprises adhesive strips, from which severed ends of the at least one fiber can be easily removed.

12. The apparatus for severing at least one optical fiber as claimed in claim 9 wherein the apparatus is designed for severing a plurality of fibers arranged in parallel.

13. The apparatus for severing at least one optical fiber as claimed in claim 3, wherein a compression spring is arranged on the rocker to move the rocker from the severing position to the inserting position after the severing operation.

14. The apparatus for severing at least one optical fiber as claimed in claim 13, wherein the bonding device comprises adhesive strips, from which severed ends of the at least one fiber can be easily removed.

15. The apparatus for severing at least one optical fiber as claimed in claim 13, wherein the apparatus for severing a plurality of fibers arranged in parallel.

16. The apparatus for severing at least one optical fiber as claimed in claim 3, wherein the bonding device comprises adhesive strips, from which severed ends of the at least one fiber can be easily removed.

17. The apparatus for severing at least one optical fiber as claimed in claim 16, wherein the adhesive strips are removably fastened to the rocker.

18. The apparatus for severing at least one optical fiber as claimed in claim 3 wherein the device is designed for severing a plurality of fibers arranged in parallel.

19. The apparatus for severing at least one optical fiber as claimed in claim 2, wherein the apparatus designed for severing a plurality of fibers arranged in parallel.

20. The apparatus for severing at least one optical fiber as claimed in claim 2 wherein the bonding device comprises adhesive strips, from which severed ends of the at least one fiber can be easily removed.

* * * * *